United States Patent [19]

Crussard et al.

[11] Patent Number: 4,511,540
[45] Date of Patent: Apr. 16, 1985

[54] EXPLOITATION OF COPPER, NICKEL AND COBALT BY TREATING MANGANIFEROUS MATRIX OXIDIZED ORES

[75] Inventors: Charles Crussard, Neuilly; Pierre Maurel, Aix-en-Provence; Jean Bonhomme, Domont, all of France

[73] Assignee: Pechiney Ugine Kuhlmann, Paris, France

[21] Appl. No.: 315,349

[22] Filed: Oct. 26, 1981

[30] Foreign Application Priority Data

Oct. 29, 1980 [FR] France ............................. 80 23422

[51] Int. Cl.³ .................. C01G 3/12; C01G 51/00; C01G 53/11
[52] U.S. Cl. ............................. 423/26; 423/36; 423/37; 423/41; 423/43; 423/45; 423/48; 423/140; 423/146; 423/150; 75/101 R; 75/108; 75/117; 75/119
[58] Field of Search ............ 423/26, 36, 37, 27, 423/45, 42, 41, 140, 43, 150, 146, DIG. 4, 48; 75/101 R, 108, 117, 119

[56] References Cited

U.S. PATENT DOCUMENTS

| | | | |
|---|---|---|---|
| 2,864,692 | 12/1958 | Mancke et al. | 423/37 |
| 3,544,306 | 12/1970 | McGauley | 423/37 |
| 4,011,072 | 3/1977 | Holman et al. | 423/26 |
| 4,029,733 | 6/1977 | Faugeras et al. | 423/DIG. 4 |

FOREIGN PATENT DOCUMENTS 833636 9/1975 Belgium .
2262699 2/1974 France .

Primary Examiner—John Doll
Assistant Examiner—Robert L. Stoll
Attorney, Agent, or Firm—McDougall, Hersh & Scott

[57] ABSTRACT

Process for treating oxidized ores with a manganiferous matrix to recover the small quantities of copper, nickel and cobalt, which consists of attacking the aforementioned ore by means of an aqueous solution of $H_2SO_4$ with the simultaneous injection of sulfur dioxide, at a temperature which does not exceed boiling point of the medium, at a pH less than 1.5; introducing an alkaline sulfide to precipitate the copper, nickel and cobalt sulfides in the suspension resulting from the attack; and separating by sulfides and the residue by flotation. The process is applicable to attacks on manganiferous nodules obtained from ocean beds as well as to attacks on land manganiferous matrix oxidized ores.

10 Claims, 1 Drawing Figure

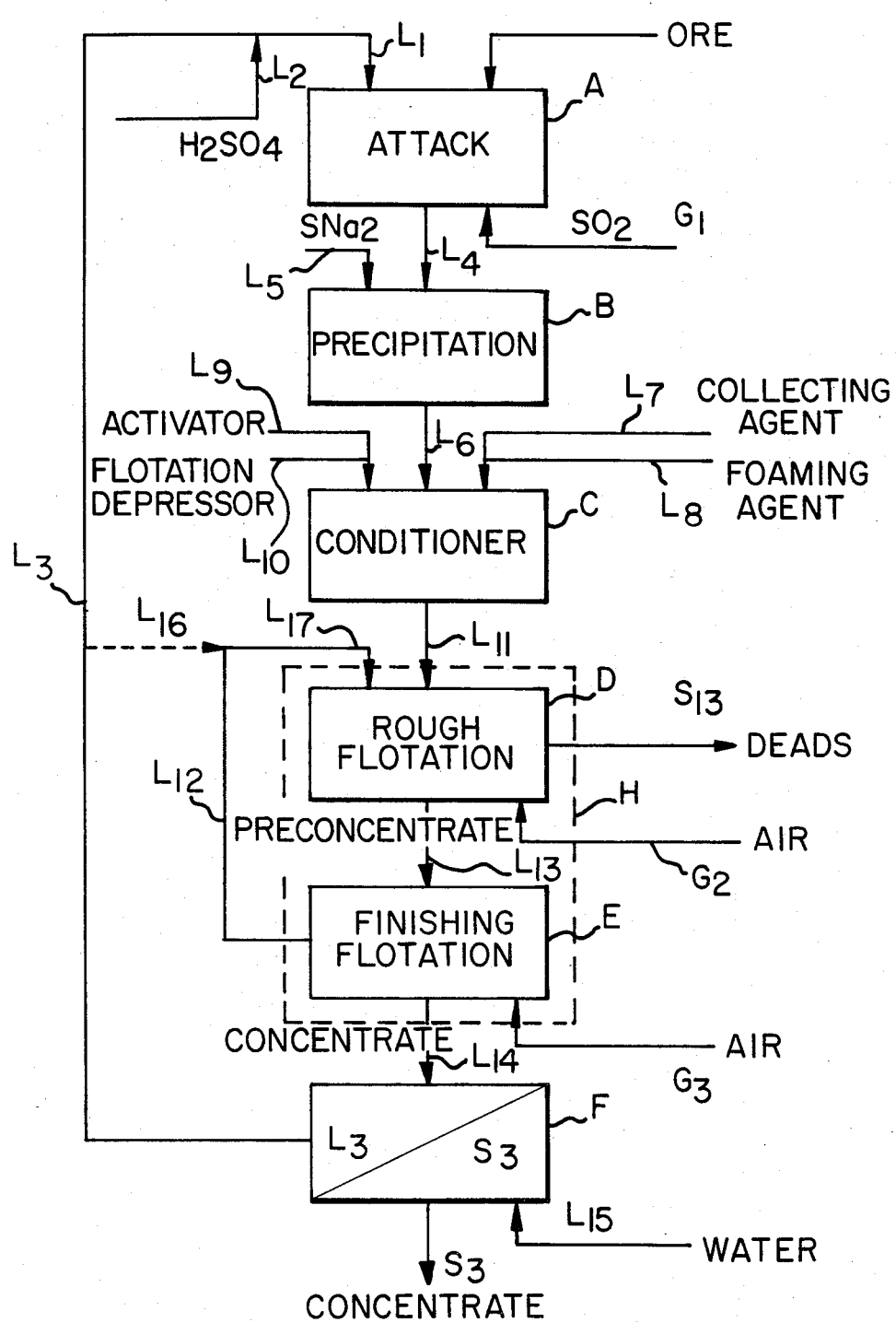

EXPLOITATION OF COPPER, NICKEL AND COBALT BY TREATING MANGANIFEROUS MATRIX OXIDIZED ORES

The invention concerns a process for treating oxidized ores with a manganiferous matrix containing copper, nickel and cobalt, for the purpose of exploiting these metals, by attacking the aforementioned ores with a sulfuric acid aqueous solution, in the presence of sulfur dioxide injected into the attack medium; then precipitating the copper, nickel and cobalt sulfides by adding an alkaline sulfide to the suspension resulting from the attack; then separating by flotation these sulfides from the deads resulting from the attack.

More specifically, the invention concerns the treatment of manganiferous nodules obtained from ocean beds and all oxidized ores where manganese dioxide constitutes the matrix to which are bound the metals to be exploited, metals such as copper, nickel and cobalt.

The attack on manganiferous matrix oxidized ores such as the attack on nodules obtained from ocean beds has already been the subject of several publications resulting from university and/or industrial research on alkaline or acid hydrometallurgical and pyrometallurgical attacks.

It is known that nodules obtained from ocean beds are composed mainly of $MnO_2$, but the exploitation of $MnO_2$ would encounter an already over-saturated world market. It is advantageous, however, to extract the nickel, copper and cobalt present in these nodules because, without upsetting the world market, they do constitute an appreciable addition to the currently known land reserves.

As these nodules contain these three metals in rather small quantities and since gathering them at great ocean depths and their transportation on shore are particularly costly factors, the technician has always been tempted to use a simple process to treat those nodules able to be used near the gathering site and still provide the best extraction yield of these three metals.

Among the processes devised, at least two of them were part of a pilot plant study.

The first, an alkaline process, involves leaching the nodules previously reduced chemically, by leaching, in aqueous medium with an attack pair consisting of $CO_2$ and $NH_3$, then precipitating a carbonated concentrate resulting from the steam extraction of $NH_3$ and $CO_2$.

This process is disadvantageous because it requires a significant investment, a large personnel and is a great consumer of thermal energy.

The other, an acid process, uses a sulfuric liquor to leach the nodules. It is in this way that this type of process is described, for example, in French Pat. No. 2 262 699. This patent claims a 3-step attack on manganiferous nodules. In step one, sulfuric acid is used to neutralize the aqueous suspension of crushed ore to a pH equal to 2. Step two consists of introducing into the suspension a quantity of sulfur dioxide corresponding to the stoichiometry of the sulfating reaction of manganese dioxide by sulfur dioxide, to a pH comprised between 1.5 and 4 in order to "destructure the ore and promote the subsequent dissolution of the metals, especially nickel, copper and the desired quantity of manganese. Step three concerns "leaching the ore by means of sulfuric acid to a pH comprised between 1 and 3 in order to achieve the selective dissolving of copper and nickel". The solid and liquid phases resulting from the attack are then separated.

There are certain disadvantages to this process which make it industrially difficult to exploit. First, its leaching yields are relatively low, especially for cobalt, in spite of leaching times as high as 30 hours. Secondly, as the technician will note, it is both difficult and costly to separate the solid and liquid phases after leaching due to the presence of fine particles formed during the attack.

Furthermore, a process for extracting nickel, copper and cobalt by hydrogen sulfide precipitation and separation by flotation of the sulfides obtained was described in Belgian Pat. No. 833 636. In this process, a "calciferous base" and hydrogen sulfide are introduced simultaneously into a sulfate solution, free of manganese, such that the pH of this solution is maintained between 2.5 and 3.5; the sulfides and the calcium sulfate present in the precipitate are then separated by flotation. If the sulfate solution contains suspended solid materials, other than calcium sulfate, the author recommends eliminating these materials by decantation or filtration before treating it according to the process. But, it is then obvious to the technician that a separation by flotation process of this type is unproductive when the contents in the metals to be precipitated in the solution to be treated are much smaller than those recommended in this process, such as 5 to 50 g/liter, and when the quantity of the suspended solid material, other than calcium sulfate, is very great.

The applicant, in his research, confronted with the dual economic necessity, i.e., the need to find a treatment involving the acid attack on manganiferous matrix oxidized ores with very high solvency yields for nickel, copper and cobalt and being able to productively exploit the aforementioned metals in sulfide form, found and developed a process that eliminates the abovecited disadvantages.

The process in the invention for treating oxidized ores with a manganiferous matrix containing small quantities of copper, nickel and cobalt, is characterized by the fact that, in order to productively exploit these metals, the aforementioned ores, after being crushed, are attacked by a sulfuric solution, by simultaneously introducing sulfur dioxide, such that the post-attack pH is less than 1.5. Then, in the suspension resulting from the attack, the copper, nickel and cobalt are precipitated by introducing an alkaline sulfide, and finally, the aforementioned sulfides are separated from the deads by flotation.

Basically, the process as in the invention consists of the following steps:

Crushing the manganiferous matrix oxidized ore until a pre-attack granulometry of less than 0.5 mm is obtained, Attacking the manganiferous matrix oxidized ore containing the copper, nickel and cobalt to be exploited, as well as other nuisance constituents, by means of a sulfuric acid aqueous solution into which sulfur dioxide is insufflated in quantities depending mainly on the manganese content of this ore, treated at a pH of less than 1.5, Maintaining the attack medium at a temperature at least equal to boiling during the dissolving operation which generally lasts between 2–7 hours and preferably between 4–5 hours, Treating the aqueous suspension resulting from the attack with an alkaline sulfide in a quantity at least equal to 1.5 times the stoichiometric quantity required to form completely the copper, nickel and cobalt sulfides, and at a temperature always lower than the temperature maintained during the attack, Separating the copper, nickel and cobalt sulfides precipitated as above by flotation in the presence of sterile gangue; this is done by introducing a collecting agent conditioned by stirring, next a foaming agent and then a controlled quantity of air which causes foaming, Filtration-washing of the copper, nickel and cobalt sulfides, Recovering a copper, nickel and cobalt concentrate in sulfide form.

The compositions of the manganiferous matrix oxidized ores, treated with the invention process, vary considerably. In the case of nodules obtained from ocean beds, and depending on where they are collected, the manganese contents may vary from 10 o 35%, the nickel contents from 0.1 to 1.5%, the copper contents from 0.05 to 2%, while the cobalt contents range from 0.1 to 0.8%.

First, the manganiferous matrix oxidized ore is crushed such that its pre-attack granulometry is less than 0.5 mm.

The oxidized mineral is attacked by a sulfuric acid aqueous liquor, its $H_2SO_4$ concentration depending not only on the copper, nickel and cobalt content of the aforementioned ore, but also on the content of solvable impurities such as sodium, potassium iron, calcium, magnesium, etc. . . . and into which is insufflated sulfur dioxide whose presence remarkably improves the solvency of the three metals to be exploited, i.e., the copper, nickel and cobalt.

In practice the total quantity of sulfur provided by the $H_2SO_4$ and $SO_2$ required to attack 1 ton of ore is comprised between 150 kg and 350 kg, expressed in S, while the quantities of sulfur provided by $SO_2$ and $H_2SO_4$ are in the mass ratio:

$$S_{(SO_2)}/S_{(H_2SO_4)}$$

which can vary between 0.1 and 1.6 depending on the quantity of $MnO_2$ present in the ore, such that the post-attack pH is less than 1.5.

The attack temperature for the manganiferous matrix oxidized ore is equal to or less than boiling temperature of the medium. It is generally comprised between 95° C. and 45° C. and preferably between 95° C. and 80° C.

After the attack on the ore is completed, the resulting aqueous suspension, composed of a non-attacked solid fraction of gangue and an aqueous fraction containing in solution the the precipitated elements as well as the impurities, undergoes precipitation for copper nickel and cobalt by introducing an alkaline sulfide such as sodium, potassium, ammonium sulfide.

The quantity of alkaline sulfide introduced into the abovecited suspension is at least 1.5 times the stoichiometric quantity required to precipitate the copper, nickel and cobalt. The quantity of alkaline sulfide introduced is comprised preferably between 1.5 and 4 times this stoichiometric quantity, but more specifically between 1.8 and 2.5.

The pH of the precipitation medium is comprised generally between 0.5 and 4, but is preferably between 1.5 and 3.5.

The temperature of the precipitation medium for the cobalt, copper and nickel sulfides is generally lower than the attack temperature of the ore and generally comprised between 10° C. and 95° C., but preferably between 25° C. and 85° C.

Finally, the applicant noted with interest that the precipitation yield of copper, nickel and cobalt greatly increased with the precipitation medium is stirred, especially briskly.

After the copper, nickel and cobalt sulfides are precipitated in the suspension resulting from the attack, the precipitated medium undergoes a flotation treatment to separate these sulfides from the gangue or deads, on the one hand, and from the aqueous fraction of the suspension, on the other.

To do this, a collecting agent is introduced into the suspension resulting from the precipitation of sulfides placed in a conditioner and stirrer; the collecting agent is from the group composed of xanthates, thio and dithio carbamates as well as sulfhydryl derivatives and is introduced in quantities which can vary between 0.8 kg and 1.5 kg per cubic meter of suspension to be treated. Next a foaming agent is introduced, the foaming agent from the group made up of $C_7$ to $C_{13}$ alcohols and propylene glycol derivatives, such as, for example, ethers, etc. . . .

Activator and/or flotation depressor agents, both known to the technician, can also be introduced into the suspension to promote the flotation of the precipitated sulfides or improve selectivity during sulfide separation. The time in the conditioner is at least five minutes.

The conditioned suspension is then transferred to a flotation cell and controlled quantities of air are insufflated into the prepared medium. The sulfides carried by the air bubbles are gathered by regularly scraping the foam surfaces, which is a method the technician knows well.

After separated from the gangue, the gathered copper, nickel and cobalt sulfides are washed and finally collected as a concentrate greatly enriched in these metals.

The process in the invention is cyclical and extracts copper, nickel and cobalt from manganiferous matrix oxidized ores, even when they are present in small amounts.

Generally speaking, the various operations of the process can be performed continuously or discontinuously.

The FIGURE illustrating the process helps to understand the process better.

According to the FIGURE, the manganiferous matrix oxidized ore is introduced into attack reactor (A) with attack liquor $L_1$ and while sulfur dioxide $G_1$ is insufflated into the medium. Aqueous suspension $L_4$ resulting from the attack is treated in (B) by sodium sulfide aqueous solution $L_5$ which causes precipitation of the copper, nickel and cobalt sulfides, in the presence of the not-attacked gangue constituting the deads.

After precipitation of the copper, nickel and cobalt sulfides, suspension $L_6$ obtained as described is placed into conditioner (C) into which collecting agent $L_7$, foaming agent $L_8$, activator $L_9$ and flotation depressor $L_{10}$ can be added.

Conditioned suspension $L_{11}$ is then transferred into a series of flotation cells, called "flotation zone (H)" whose two main steps are illustrated in zones (D) and (E).

Suspension $L_{11}$ enters in (D) representing a series of flotation cells. The air introduced by $G_2$ effects this suspension, allowing a rough separation of the copper, nickel and cobalt sulfides from the gangue. Zone (D)

can also receive a recycled aqueous suspension of mixed residus $L_{17}$ formed of $L_{12}$ and, eventually, a fraction of $L_{16}$.

In zone (D), an aqueous suspension $L_{13}$ forming a copper, nickel and cobalt sulfide preconcentrate, is collected and gangue $S_{13}$, which remained untouched, is eliminated.

Preconcentrate $L_{13}$ is then treated in finishing zone (E) by air injection $G_3$. By the same process as the one used in zone (D), a concentrate increasingly rich in the desired metals is obtained. Finally, the concentrate suspension $L_{14}$ enters in (F) where it undergoes solid-liquid separation and is washed with water $L_{15}$.

The obtained liquid fraction $L_3$ is then returned to (A) and, eventually for a part, in (D) (see $L_{16}$). The fraction of $L_3$ introduced in (A) is mixed with an additional sulfuric liquor, this mixture constituting attack liquor $L_1$.

Solid fraction $S_3$ is extracted from (F) and constitutes the desired copper, nickel and cobalt sulfide concentrate to be exploited.

EXAMPLE 1

In this example, the applicant wanted to show how great the effect the attack process in the invention is when manganiferous matrix oxidized ore is attacked simultaneously by a sulfuric solution into which sulfur dioxide is injected, by comparing it with the process in prior art where the same ore is attacked, first by sulfur dioxide in step 1, then by sulfuric liquor in step 2.

With this in mind, the applicant performed two attack tests on nodules obtained from ocean beds, using precise quantities of $SO_2$ and $H_2SO_4$ per ton of ore; the attack aqueous liquor was used differently in tests 1 and 2.

The composition, expressed in % by weight, of the nodules obtained from ocean beds, was the following:
CuO: 1.27%
CoO: 0.18%
NiO: 1.33%
$MnO_2$: 42.23%
MgO: 3.53%
$Na_2O$: 2.39%
$K_2O$: 0.90%
$Fe_2O_3$: 10.29%
CaO: 1.80%
$SiO_2$: 11.90%

In each test, a given quantity of nodules, crushed, less than 0.5 mm in size and dried, was attacked while stirred with an acid aqueous solution, for approximately 4 hours at 95° C.

In test 1, pertaining to the process in the invention, the crushed, dried ore is treated in only one step by 250 kg of $H_2SO_4$ per ton of ore with the injection of 230 kg of $SO_2$ per ton of ore.

In test 2, pertaining to prior art, the crushed, dried ore was treated:
in step 1, by 230 kg of $SO_2$ per ton of ore,
in step 2, by 250 kg of $H_2SO_4$ per ton of ore.

After attack, the solvency yields of the copper, nickel and cobalt were measured. The test results are in table I below:

TABLE 1

| | SOLVENCY YIELD IN % | | |
|---|---|---|---|
| | Copper | Nickel | Cobalt |
| Test 1 | 70% | 90% | 68% |
| Test 2 | 64% | 71% | 8% |

The applicant observed that when the ore was attacked simultaneously by $H_2SO_4$ and $SO_2$, the solvency yields of copper, nickel and cobalt were much higher than when the same ore was attacked successively, first by $SO_2$, then by $H_2SO_4$, as recommended in prior art.

EXAMPLE 2

In this example, the applicant wanted to show how great the effect the pH of the attack medium and the $SO_2$ is on the solvency yields of manganese, iron, copper, cobalt, nickel and magnesium.

To do this, he performed 8 attack tests on nodules obtained from ocean beds, using different relative quantities of $H_2SO_4$ and $SO_2$, so that the post attack pH could be varied between 0.3 and 2.

In each test, an appropriate quantity of crushed, dried nodules was attacked while stirring by means of a sulfuric acid aqueous solution into which $SO_2$ was insufflated, at 95° C. (boiling point) for approximately 4 hours.

The composition, expressed in % by weight, of the nodules obtained from ocean beds, was the following:
CuO: 1.27%
CoO: 0.18%
NiO: 1.33%
$MnO_2$: 42.23%
MgO: 3.53%
$Na_2O$: 2.39%
$K_2O$: 0.90%
$Fe_2O_3$: 10.29%
CaO: 1.80%
$SiO_2$: 11.90%

All numerical data for the 8 tests and the test results are in table II below:

TABLE II

| No. of test | Dry mineral mass in g. | Quantity of water present during attack in g. | Attack $H_2SO_4$ per ton of dry ore in kg | $SO_2$ injected during attack in kg per T of dry ore | post-attack liquor pH | SOLVENCY YIELD IN % | | | | | |
|---|---|---|---|---|---|---|---|---|---|---|---|
| | | | | | | Mn | Fe | Cu | Co | Ni | Mg |
| 3 | 58 | 118 | 362 | 319 | 0.3 | 99 | — | 95 | 100 | 98 | 91 |
| 4 | 58 | 118 | 348 | 300 | 0.8 | 97 | — | 94 | 97 | 96 | 89 |
| 5 | 58 | 118 | 348 | 252 | 0.9 | 82 | — | 88 | 75 | 94 | 90 |
| 6 | 58 | 119 | 348 | 219 | 1.0 | 85 | — | 87 | 79 | 95 | 89 |
| 7 | 420 | 1128 | 302 | 238 | 1.3 | 82 | 3 | 82 | 72 | 86 | 87 |
| 8 | 2000 | 2819 | 250 | 220 | 1.65 | 75 | 1 | 61 | 65 | 83 | 80 |
| 9 | 560 | 973 | 252 | 227 | 2.0 | 75 | 9 | 55 | 63 | 80 | 80 |
| 10 | 58 | 119 | 348 | 0 | 0.65 | 1 | 10 | 41 | 2 | 58 | 87 |

The applicant noted that, in order to obtain a good solvency yield in copper, nickel and cobalt, the pH of the liquor after the attack had to be lower than 1.5. The applicant also verified that cobalt solvency in a sulfuric attack without $SO_2$ was not possible.

EXAMPLE 3 (ILLUSTRATED BY THE INVENTION)

The applicant treated ocean nodules from the Pacific with the following composition in % by weight, in oxidized form:

CuO: 1.27%
CoO: 0.18%
NiO: 1.33%
$MnO_2$: 42.23%
MgO: 3.53%
$Na_2O$: 2.39%
$K_2O$: 0.90%
CaO: 1.80%
$Fe_2O_3$: 10.29%
$SiO_2$: 11.50%
Others+fire loss: 24.58%

The ocean nodules were crushed such that their pre-attack granulometry was less than 0.5 mm. 100 parts of ocean nodules were put in suspension in (A) in 240 parts of a sulfuric acid aqueous solution containing 36.2 parts of $H_2SO_4$.

The suspension obtained as above was stirred at 95° C. for 5 hours during which an $SO_2$ gas flow was insufflated by means of a diffuser, allowing good gas dispersion in the suspension.

The suspension absorbed 31.9 parts of the $SO_2$ gas. The solvency yields for the main elements initially present in the nodules were the following:

Manganese: 99%
Copper: 94%
Cobalt: 100%
Nickel: 98%
Magnesium: 90%

The post-attack pH was 0.35.

The suspension obtained during the attack was then introduced into zone (B) where the pH was raised to 2.

Then, into the suspension treated as above and stirred, was introduced an $Na_2S$ liquor at 100 g/l, the quantity being twice the stoichiometry required to form all the copper, nickel and cobalt sulfides solubilized during the attack on the nodules.

The pH, after precipitation, was 4 while the prevalent temperature in the zone was 75°.

The precipitation yield in % was:
Copper: 100%
Nickel: 94.3%
Cobalt: 97.7%
Manganese: 5.1%

The suspension from precipitation zone (B) and containing the precipitated sulfides was introduced in (C), the conditioning zone, into which was added a mixture of collecting agents made up of 2% potassium amylxanthate and 3% ethyl isopropylthio carbamate, these percentages being expressed in relation to the theoretical weights of the precipitated copper, nickel and cobalt metals.

The time it took for the collecting agents to react on the precipitated sulfides was approximately 10 minutes. Then 0.2% propylene glycol ether, expressed in relation to the theoretical weights of the precipitated copper, nickel and cobalt, was added. The suspension conditioned as above was introduced in (D) and produced a preconcentrate containing approximately 15% copper, nickel and cobalt metals with a 98% yield.

The suspension was then treated in (E) and produced a concentrate containing approximately 35% of the desired metals with a 100% yield with respect to the concentrate.

Finally, the concentrate obtained was separated and washed, the washing waters being recycled by parts in (A) and (D).

The preconcentrate and concentrate compositions are in table III below:

TABLE III

| | FLOTATION: COMPOSITION IN % BY WEIGHT | |
| --- | --- | --- |
| ELEMENT | Zone D Preconcentrate rough output | Zone E Concentrate output at completion |
| S | — | 21.36% |
| Ni | 8.75% | 20.32% |
| Co | 1.1% | 2.59% |
| Fe | — | 6.20% |
| Mn | — | 1.77% |
| Cu | 5.0% | 11.62% |
| Zn | — | 2.95% |
| Pb | — | 0.043% |
| Cd | — | 0.040% |
| Tl | — | 0.10% |
| Mo | — | 0.07% |
| Ba | — | 0.12% |
| Y | — | 0.01% |
| Sr | — | 0.02% |
| Mg | — | 0.125% |
| Zr | — | 0.02% |
| Al | — | 1.52% |
| Ca | — | 0.003% |
| Na | — | 0.31% |
| K | — | 0.36% |
| $SiO_2$ | — | 4.68% |

EXAMPLE 4

The applicant treated a manganiferous matrix oxidized ore, obtained by enriching a land ore by a physical process and with the following composition expressed in % by weight:

| | |
| --- | --- |
| Nickel expressed by Ni | 1.44% |
| Cobalt expressed by Co | 4.26% |
| Iron expressed by Fe | 24.68% |
| Manganese expressed by Mn | 8.7% |
| Aluminium expressed by $Al_2O_3$ | 6.41% |
| Chrome expressed by Cr | 3.48% |
| Magnesium expressed by Mg | 2.66% |
| Titanium expressed by $TiO_2$ | 0.71% |
| Silicon expressed by $SiO_2$ | 10.75% |
| Fire loss | 14.9% |

This ore was crushed so that its granulometry would be less than 0.5 mm.

100 parts of this crushed ore were suspended in 200 parts of a sulfuric aqueous solution containing 72 parts of $H_2SO_4$.

The suspension was stirred for 5 hours while, during this time, an $SO_2$ flow was insufflated into the attack medium.

The attack temperature was maintained between 60° C. and 90° C. for the entire operation.

The quantity of $SO_2$ introduced during the attack was 9.65 parts.

The $S(SO_2)/S(H_2SO_4)$ ratio was 0.18.

The post-attack pH was 0.65.

The solvency yields were:
Nickel (Ni): 97%

Cobalt (Co): 94%
Iron (Fe): 53%
Aluminium (Al$_2$O$_3$): 45%
Chrome (Cr): 6%
Magnesium (Mg): 92%
Manganese (Mn): 95%

The suspension was then treated as in example 3 by SNa$_2$ and was subjected to flotation.

We claim:

1. In a process for treating oxidized ores with a manganiferous matrix containing small quantities of copper, nickel and cobalt for the purpose of separating these metals from the ore, wherein said ores are crushed, and then attacked by treatment with a sulfuric acid solution and sulfur dioxide, the improvement comprising the step of injecting said sulfur dioxide into said solution simultaneously with said attack, whereby the post-attack pH of the medium is less than 1.5, and thereafter precipitating the copper, nickel and cobalt sulfides in the suspension resulting from the attack by introducing an alkaline sulfide, the pH of the precipitation medium being in the range of 0.5–4; and finally separating the aforementioned sulfides by flotation.

2. Process as in claim 1, characterized in that the total quantity of sulfur, in H$_2$SO$_4$ and SO$_2$ form, required to complete the attack on one ton of ore, is comprised between 150 kg and 350 kg.

3. Process as in claim 1, characterized in that the quantities of sulfur, in SO$_2$ and H$_2$SO$_4$ form, are in a mass ratio comprised between 0.1 and 1.6.

4. Process as in claim 1, characterized in that the attack temperature for the oxidized ore is comprised between 95° C. and 45° C.

5. Process as claimed in claim 1 characterized in that the quantity of alkaline sulfide introduced is within the range of 1.4–4 times the stoichiometric amount required to form all of the copper, nickel and cobalt sulfides solubilized by the attack.

6. Process as in claim 1, characterized in that the precipitation temperature for the sulfides is comprised between 10° C. and 95° C.

7. Process as in claim 1, characterized in that the suspension resulting from the attack is briskly stirred while the sulfides are being precipitated.

8. The process of claim 4 wherein the attack temperature for the oxidized ore is about 95° C. to 80° C.

9. The process of claim 1 wherein the pH of the precipitation medium is between 1.5 and 3.5.

10. The process of claim 6 wherein the precipitation temperature for the sulfides is 20° C. to 85° C.

* * * * *